United States Patent [19]

Gregory

[11] Patent Number: 5,625,267
[45] Date of Patent: Apr. 29, 1997

[54] CONSTANT DELAY FILTERING FOR SYNCHRONIZED MOTION ON MULTIPLE AXES

[75] Inventor: Raymond D. Gregory, Muskogee, Okla.

[73] Assignee: Coburn Optical Industries, Inc., Tulsa, Okla.

[21] Appl. No.: 571,443

[22] Filed: Dec. 13, 1995

[51] Int. Cl.$^6$ .................................................. G05B 11/32
[52] U.S. Cl. ................... 318/625; 318/35; 318/85; 318/606; 318/621; 364/724.01
[58] Field of Search .................. 318/560–561, 318/567, 569, 575, 600–602, 609–611, 606–608, 615–618, 621, 624, 632, 625, 671, 677–678, 687, 34, 35, 37, 39, 51, 53, 66–71, 85, 112; 364/724.01–724.2

[56] References Cited

U.S. PATENT DOCUMENTS

| | | | |
|---|---|---|---|
| 4,694,414 | 9/1987 | Christopher | 364/724.1 |
| 4,852,434 | 8/1989 | Bald | 318/35 |
| 4,992,714 | 2/1991 | Matsushita et al. | 318/625 |
| 5,093,972 | 3/1992 | Kaku et al. | 318/35 |
| 5,245,565 | 9/1993 | Petersen et al. | 364/724.01 |
| 5,329,216 | 7/1994 | Hasegawa et al. | 318/625 |
| 5,455,495 | 10/1995 | Bec | 318/625 |
| 5,463,603 | 10/1995 | Petersen | 369/48 |

*Primary Examiner*—David S. Martin
*Attorney, Agent, or Firm*—Frank J. Catalano; Scott R. Zingerman

[57] ABSTRACT

In a linear feedback servo control system, the motion profile for each axis is pre-filtered before it is introduced to the servo loop for that axis. The motion profile is pre-filtered by a filter having an inverse amplitude response to the amplitude response of the servo loop. Therefore, the composite amplitude response of the filter/servo loop combination is approximately ideal for all relevant frequencies. The pre-filtering is done using constant delay filters, whether high pass, low pass or hybrid, that exhibit a phase lag corresponding to a time delay that is essentially constant at all relevant frequencies. Each axis of synchronized motion is pre-filtered with constant delay filters having the same time delay constant, but selected so that the motion of each axis provides sufficient accuracy within the intended bandwidth of that particular axis. Consequently, while phase lag is not zero, there is essentially constant delay for all axes at all relevant frequencies. Therefore, synchronized motion is preserved because motion in all axes is delayed by a constant amount.

5 Claims, 3 Drawing Sheets

5,625,267

CONSTANT DELAY FILTERING FOR SYNCHRONIZED MOTION ON MULTIPLE AXES

BACKGROUND OF THE INVENTION

This invention relates generally to linear feedback servo control systems and more particularly concerns such control systems as applied to the generation of ophthalmic lenses.

Typically, on substantially linear feedback control systems equipped with a linear servo algorithm such as a proportional integral derivative or PID loop, feed forward terms are introduced to minimize following error during continuous motion. These systems frequently employ both velocity feed forward and acceleration feed forward terms to obtain accuracy as close to ideal as possible for the intended bandwidth of motion. The ideal condition for best accuracy would be to have a zero phase response or lag and an amplitude response of unity or 0 dB throughout the bandwidth of intended motion for that axis. Normally in such systems the phase response can be tuned by adjusting the feed forward parameters so that, at lower frequencies, approximately no phase lag is observed. When this is done, the amplitude response often resembles a high pass or sometimes a low pass filter. However, the amplitude response at the very lowest frequencies will be approximately unity or 0 dB.

On systems involving the synchronized motion of multiple axes, the phase response in the desired frequency bandwidth is obtained by adjusting the feed forward parameters of each axis. The result is that each axis has good phase response at lower frequencies but has an amplitude response resembling a filter. Unfortunately, the filter characteristics for the amplitude response of each axis are different. Quite often, it is required that one, or several, of the synchronized axes have motion at higher than the very lowest frequencies where, as stated above, the amplitude response of each axis is already approximately unity. Typically, this is the case for mechanisms involving a fast tool servo. In order to achieve ideal conditions for accuracy throughout the system, the amplitude response of the fast moving axes should be altered to be approximately equal to unity in the intended motion bandwidth for those axes while at the same time maintaining approximately zero phase lag for all synchronized axes in their respective intended motion bandwidths.

It is, therefore, an object of this invention to provide a multiple axis linear feedback servo control system suitable for the generation of an ophthalmic lens. Another object of this invention is to provide a multiple axis linear feedback servo control system which coordinates the phase responses of the synchronized motion axes. A further object of this invention is to provide a multiple axis linear feedback servo control system which applies similar filter characteristics to the servo mechanisms controlling the synchronized motion axes. A further object of this invention is to provide a multiple axis linear feedback servo control system which alters the amplitude response of fast moving axes to improve accuracy over the intended motion bandwidth. And, it is an object of this invention to provide a multiple axis linear feedback servo control system which maintains an approximately zero phase lag for all synchronized motion axes when the amplitude response of the fast moving axes have been altered to improve accuracy over the intended motion bandwidth.

SUMMARY OF THE INVENTION

In accordance with the invention, a linear feedback servo control system is provided in which the motion profile for each axis is pre-filtered before it is introduced to the servo loop for that axis. The motion profile is pre-filtered by a filter having an inverse amplitude response to the amplitude response of the servo loop. Therefore, the composite amplitude response of the filter/servo loop combination is approximately ideal for all relevant frequencies. The pre-filtering is done using constant delay filters, whether high pass, low pass or hybrid, that exhibit a phase lag corresponding to a time delay that is essentially constant at all relevant frequencies. Each axis of synchronized motion is pre-filtered with constant delay filters having the same time delay constant, but selected so that the motion of each axis provides sufficient accuracy within the intended bandwidth of that particular axis. Consequently, while phase lag is not zero, there is essentially constant delay for all axes at all relevant frequencies. Therefore, synchronized motion is preserved because motion in all axes is delayed by a constant amount.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
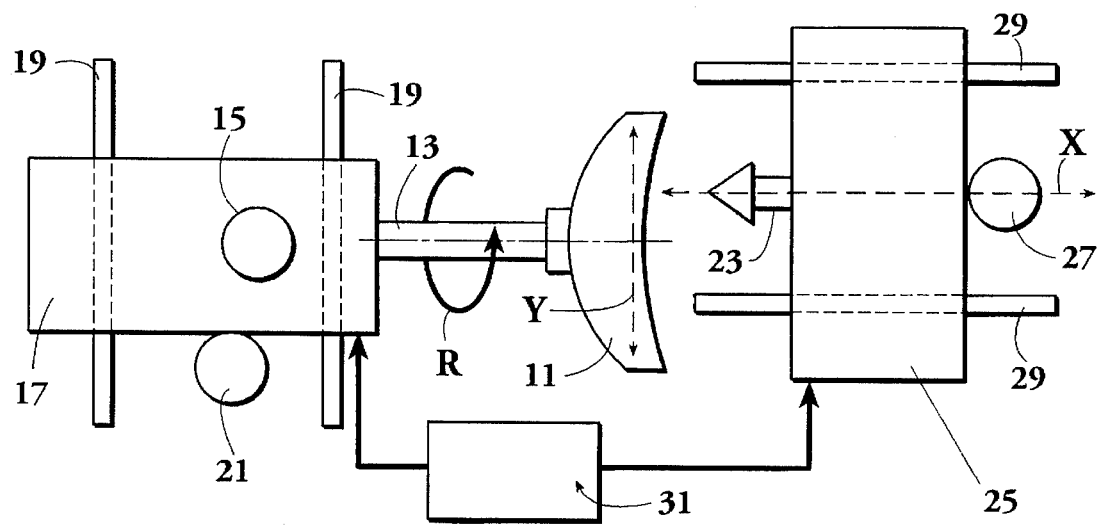
FIG. 1 is a block diagram illustrating a typical multiple axis motion system to be synchronized.

Turning first to FIG. 1, a synchronized multiple axis motion application for generation of ophthalmic lenses is illustrated. In lathing a selected prescription topography on a lens 11, the lens 11 is mounted for rotation on a spindle 13 which is driven about its axis of the rotation R by a drive mechanism 15 supported on a mount 17. The spindle 13 as shown rotates in a clockwise direction looking at the face of the lens 11 to be generated. In addition to this rotational movement, the mount 17 translates along a Y axis, as shown on tracks 19 in response to another drive mechanism 21, such as a motor driving a worm gear. The lathing tool 23 is located on another mount 25 which moves reciprocally in the direction of the X axis in response to a third drive mechanism 27 such as an electric motor connected to a worm gear. As shown, the tool mount 25 reciprocates on tracks 29. In this application, the operation of the three drive mechanisms 15, 21 and 27 must be synchronized so that the combined motion of the tool 23 and the lens 11 provide an accurate prescription topography. If the lens prescription defines a toric topography, one revolution of the lens 11 will occur simultaneously with one interval of translation of the lens mount 17. However, in that same revolution, the lathing tool mount 25 will experience two full cycles of reciprocation. The operation of the system is controlled by a computer 31.

Figure 2:
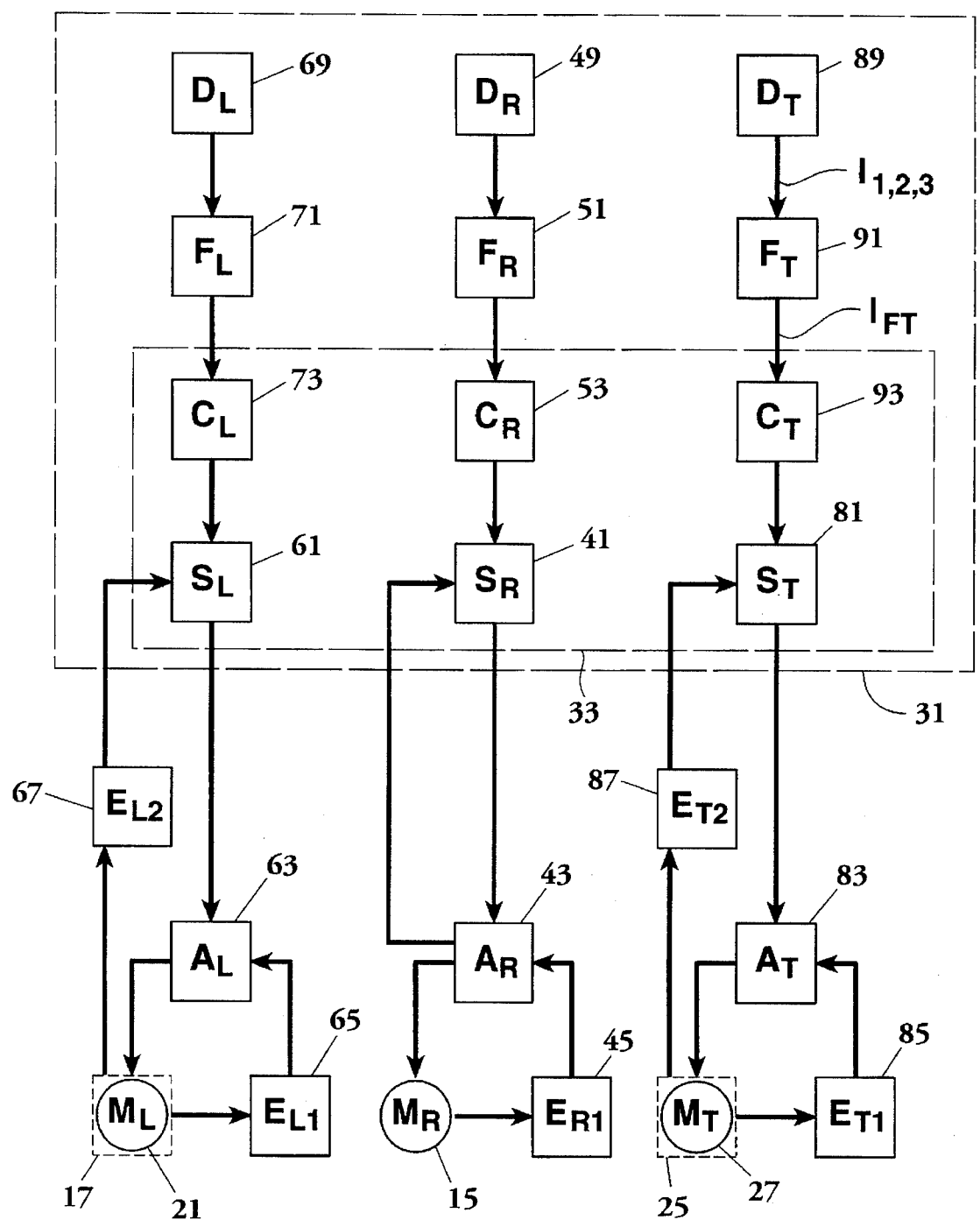
FIG. 2 is a block diagram illustrating a preferred embodiment of the constant delay filter system for synchronizing motion on multiple axes.

Turning now to FIG. 2, a preferred embodiment of a servo control system for synchronizing motion on the X, Y and R axes is illustrated. The operation of the rotational drive motor 15 is controlled by a rotational servo loop 41 which feeds a signal to the rotational amplifier 43 which in turn controls the operation of the rotational drive motor 15. A feedback signal from the rotational drive motor 15 is fed from the rotational encoder 45 back to the amplifier 43 which in turn feeds the feedback signal to the rotational servo loop 41. Similarly, a lens servo loop 61 provides a control signal via a lens amplifier 63 to control the lens drive motor 21, causing translation of the lens 11 in the Y axis. A feedback signal derived from the lens drive motor 21 is fed from an encoder 65 to the lens amplifier 63. In addition, another encoder 67 receives a mechanical signal from the lens mount 17 for feedback to the lens servo loop 61. In the tool servo system, the tool servo loop 81 controls the tool drive motor 27 through a tool amplifier 83, a feedback signal being fed from the tool drive motor 27 through an encoder 85 and back to the tool amplifier 83. In addition, a tool encoder 87 receives a mechanical signal from the tool mount 25 for feedback to the tool servo loop 81.

Each of the servo loops 41, 61 and 81 are preferably proportional integral derivative or PID controllers, though other types of loops such as pole placement filters could be employed. Each of these servo loops 41, 61 and 81 employs velocity feed forward and acceleration feed forward parameters and is tuned to obtain optimal accuracy for the intended bandwidth of motion.

Figure 3:
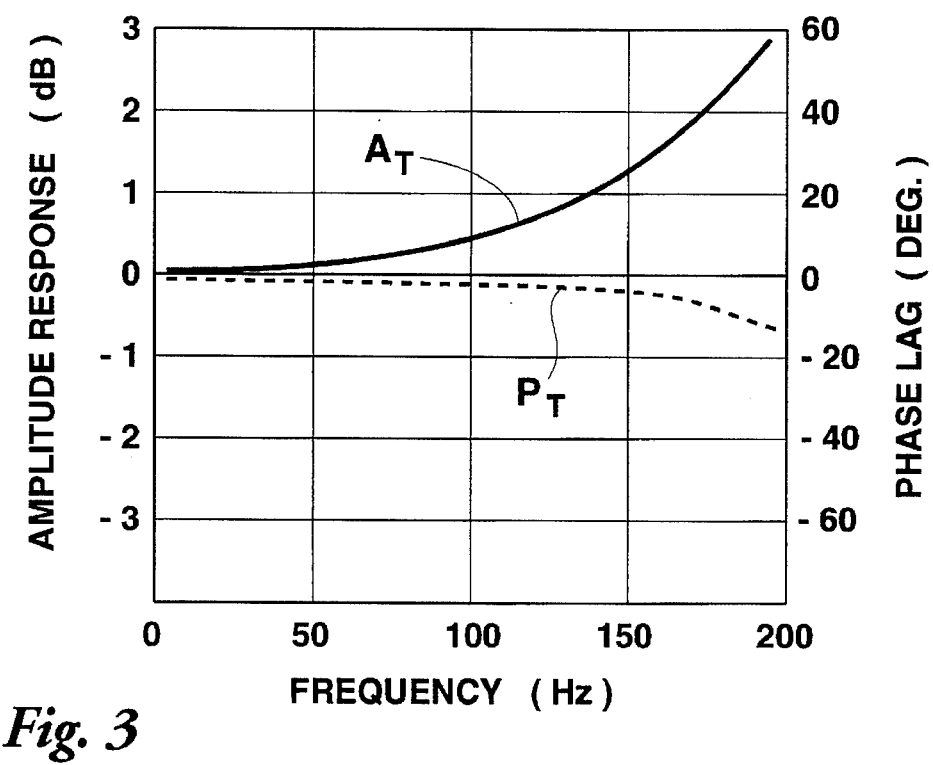
FIG. 3 is a graphic representation of the amplitude and phase lag curve of a typical relatively high frequency range servo loop.

Turning to FIG. 3, the amplitude and phase lag curves for the tool servo loop 81, $A_T$ and $P_T$ respectively, are illustrated. It can be seen that, even at relatively low frequencies, the amplitude response $A_T$ varies from the zero decibel level and the variation increases significantly as the frequency increases. On the other hand, there is substantially no phase lag $P_T$ at lower frequencies and only a relatively small phase lag variation at higher frequencies. Clearly, it is most desirable to operate in a frequency range of 0 to 100 Hz and a preferred range of operation would be in a range of 0 to 70 Hz, though even in this range the amplitude response $A_T$ displays variance from the zero decibel level. The response curves $A_T$ and $P_T$ are determined with respect to the frequency of the tool 23 because the tool 23 traces a relatively assymetric surface and travels at relatively higher frequencies. Consequently, if the tool amplitude response $A_T$ can be brought to unity or zero decibels in the desired frequency range, accurate synchronization of the lens axes of rotational and translating motion can be accomplished as well.

Given the above, the amplitude and phase lag curves $A_T$ and $P_T$ for the tool servo loop 81 are determined by graphically representing a ratio of the tool servo loop output data to input data, or Bode plot, for input signals over the desired range of frequencies. This results in the curves illustrated in FIG. 3. From this it can be seen that, if the input signal to the tool servo loop 81 is filtered in a filter system having an amplitude response curve that is an inversion reflection of the tool servo loop curve $A_T$, then the filter system characteristics will, when combined with the servo loop characteristics, result in a substantially unity or 0 dB amplitude response across the desired range of frequencies.

Figure 4:
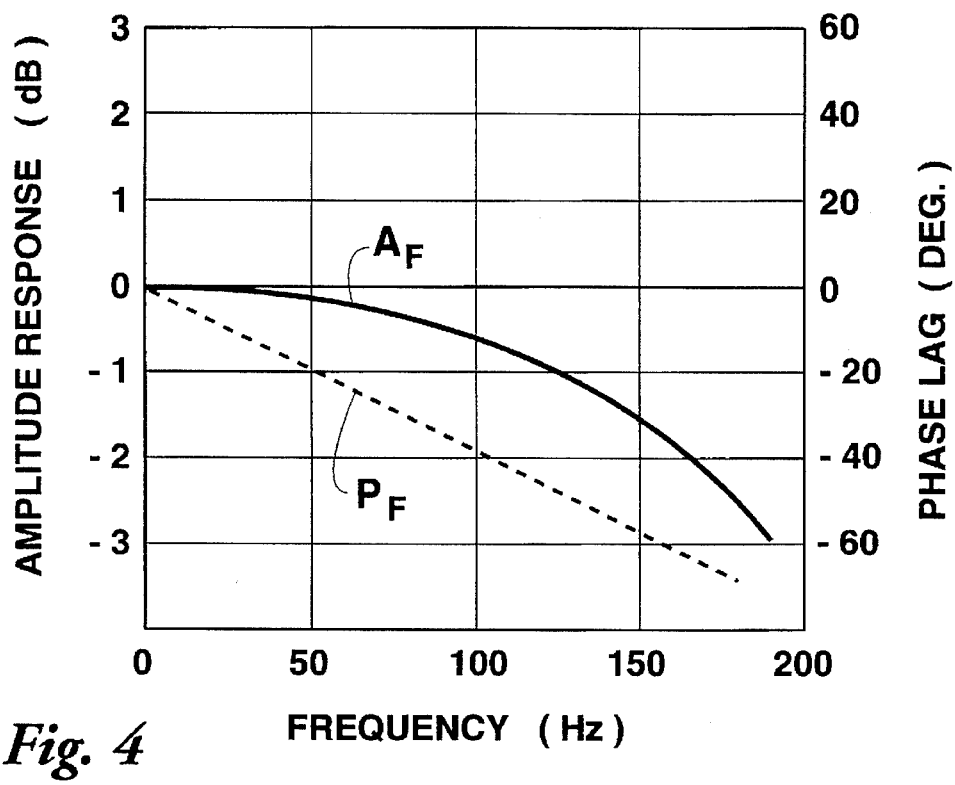
FIG. 4 is a graphic representation of the amplitude and phase lag curve of a constant delay filter designed to cancel the variation in amplitude on the servo loop curve of FIG. 3.
Figure 5:
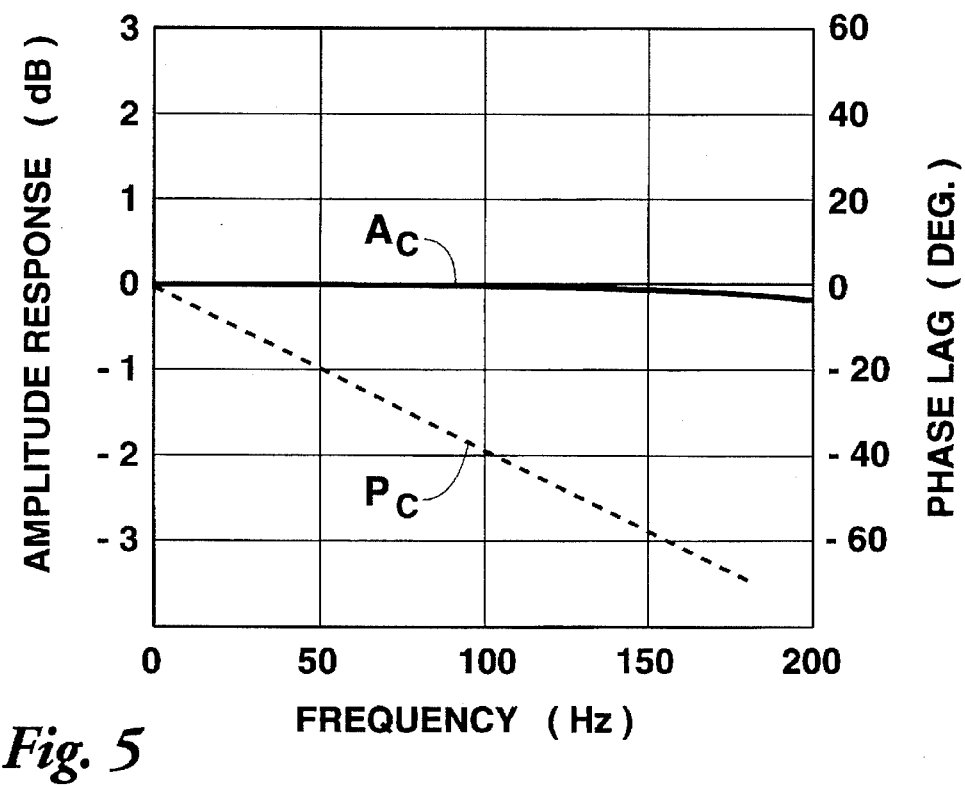
FIG. 5 is a graphic representation of the amplitude and phase lag curve of a servo loop system output using the servo loop of FIG. 3 and the filter of FIG. 4.

Returning to FIG. 2, the computer 31 calculates the tool path data for the movement of the lens 11 in the Y and R axes and the tool 23 in the X axis. Thus, upon request for topography data respecting a particular prescriptive lens 11, the computer 31 generates a stream of tool data 89 which is received by a tool data filter 91. The tool data filter 91, preferably a cascade of filters operating over the desired frequency range to allow for better control of the system, uses constant delay filters in which the phase lag is substantially constant at all relevant frequencies. The tool filter 91 is defined by the equations:

$$I_{FT} = \alpha I_3 + \beta I_2 + \delta I_1;$$
$$\alpha = \delta; \text{ and}$$
$$\alpha + \beta + \delta = 1,$$

where $I_{FT}$ is the output of the tool filter 91, $I_3$ is the input to the tool filter 91 representative of the tool position at an instant in time, $I_2$ is the input to the tool filter 91 representative of the position of the tool at the next preceding instant of time and $I_1$ is the input to the tool filter 91 representative of the position of the tool at the next-next preceding instant of time. $\alpha$, $\beta$ and B are constants. By selecting values for $\beta$ and applying standard digital control system theory to calculate filter response curves of the tool filter 91, $\beta$ can be varied until the amplitude response curve $A_F$ of the tool filter 91 is an inversion or reflection of the amplitude response curve $A_T$ of the tool servo loop 81, as is shown in FIG. 4. However, as can be seen in FIG. 4, the desired amplitude response curve $A_F$ causes a constant phase lag $P_F$ due to the tool filter 91. Consequently, the tool servo loop 81 will control the operation of the tool drive motor 27 in accordance with a corrected amplitude response curve $A_c$ as illustrated in FIG. 5, but with the constant phase lag curve $T_c$ corresponding to the phase lag curve $P_F$ of the tool filter 91.

However, having established the parameters of the tool filter 91, all of the motion axes are brought into synchronized operation by incorporating similar or identical constant delay filters 51 and 71 to receive the rotational and translational data streams 49 and 69, respectively, from the computer 31. The lens rotation filter 51 and lens translation filter 71 are selected to have substantially identical phase lag characteristic curves as the corrected phase lag characteristic curve $P_c$ of the tool servo loop 81. Consequently, the rotational and translational servo loops 41 and 61 for the lens 11 will operate in the same phase lag relationship as the tool servo loop 81, resulting in synchronization of the system.

The servo system is completed by use of trajectory calculators 53, 73 and 93 which receive topography data from their respective filters 51, 71 and 91 at a relatively low rate of speed, for example, in a range of 3 milliseconds per data point, and interpolates so as to output a data stream to their respective servo loops 41, 61 and 81 at a relatively high speed, for example, in a range of approximately 0.1 milliseconds per data point.

The data defining the lens topography for each motion axis and defining the constant delay filters 51, 71 and 91 are preferably stored in the memory of the computer 31. In addition, the servo loops 41, 61 and 81 and the trajectory calculators 53, 73 and 93 are preferably part of a motion control card 33 contained in the computer 31. While sufficient accuracy of the application above described has been achieved by using identical filters 51, 71 and 91, in some applications it may be desirable to empirically match the amplitude response curve of each filter to the servo loop with which it is associated, provided, of course, the phase lag response is maintained substantially identical to the phase lag response of the higher frequency motion axis servo loop. In any case, by matching the phase lag curves of servo loops serving multiple motion axes after correcting the higher frequency axis servo loop amplitude curve to a unity or 0 decibel level, a synchronized, improved-accuracy, multi-axis motion system is achieved.

The above principle can be applied in multi-axis systems having more than one axis moving at higher frequencies. In this case, the process of inverting the amplitude response of the servo loop of each of the high frequency axes is repeated, provided that the time delay for all constant delay filters are substantially identical.

Thus, it is apparent that there has been provided, in accordance with the invention, a method and apparatus for constant delay filtering a servo-system for synchronizing motion on multiple axes that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A constant delay filter system for synchronizing motion on multiple axes in a linear feedback servo control system in which a first servo loop controls operation of a first drive mechanism causing motion on one axis at relatively high frequencies and a second servo loop controls operation of a second drive mechanism causing motion on another axis at relatively low frequencies comprising:

a first constant delay filter filtering an input signal to the first servo loop and having an amplitude response curve which is substantially an inversion of an amplitude response curve of the first servo loop over the relatively high frequencies; and a second constant delay filter filtering an input signal to the second servo loop and having a phase lag response curve substantially the same as a phase lag response curve of said first constant delay filter.

2. A system according to claim 1, said second constant delay filter being substantially identical to said first constant delay filter.

3. In a linear feedback servo control system having a third servo loop which controls operation of a third drive mechanism causing motion on a third axis at relatively low frequencies, a system according to claim 1 further comprising a third constant delay filter filtering an input signal to the third servo loop and having a phase lag response curve substantially the same as a phase lag response curve of said first constant delay filter.

4. A system according to claim 1, said first constant delay filter being defined by the equations:

$$I_{FT} = \alpha I_3 + \beta I_2 + \delta I_1;$$
$$\alpha = \delta; \text{ and}$$
$$\alpha + \beta + \delta = 1,$$

where $I_{FT}$ is an output of said filter, $I_3$ is an input to said filter representative of a position of said first axis at a first instant in time, $I_2$ is an input to said filter representative of a position of said first axis at a second instant in time preceding said first instant of time, $I_1$ is an input to said filter representative of a position of said first axis at a third instant in time preceding said second instant of time and $\alpha$, $\beta$ and $B$ are constants.

5. A method for synchronizing motion on multiple axes in a linear feedback servo control system in which a first servo loop controls operation of a first drive mechanism causing motion on one axis at relatively high frequencies and a second servo loop controls operation of a second drive mechanism causing motion on another axis at relatively low frequencies comprising the steps of:

determining the amplitude response curve of the first servo loop;

filtering an input signal to the first servo loop using a constant delay filter having an amplitude response curve which is substantially an inversion of the first servo loop amplitude response curve;

determining the phase lag response curve of the first constant delay filter; and filtering an input signal to the second servo loop using a second constant delay filter having a phase lag response curve which is substantially identical to the first constant delay filter response curve.

* * * * *